United States Patent Office 3,109,345
Patented Nov. 5, 1963

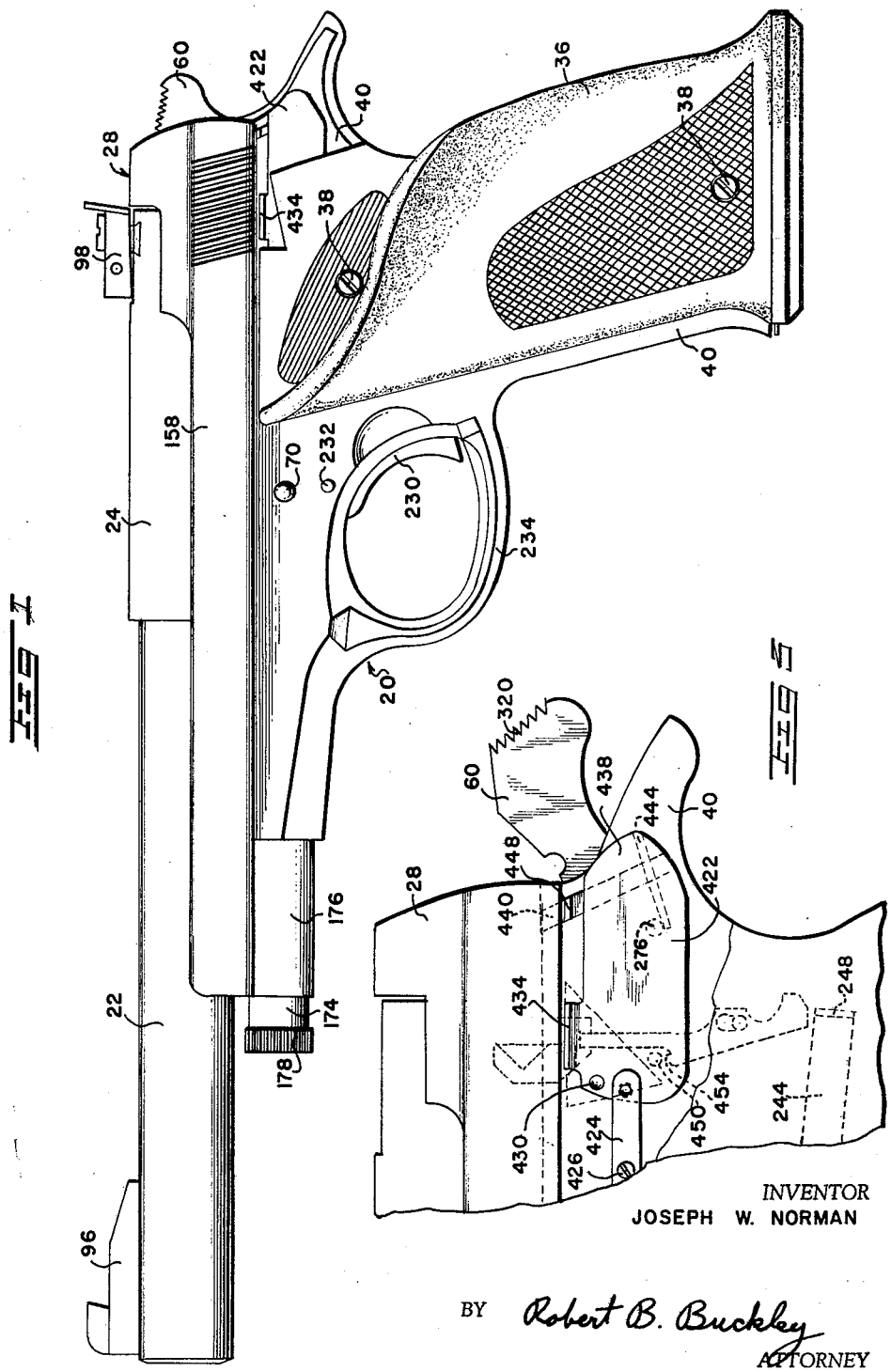

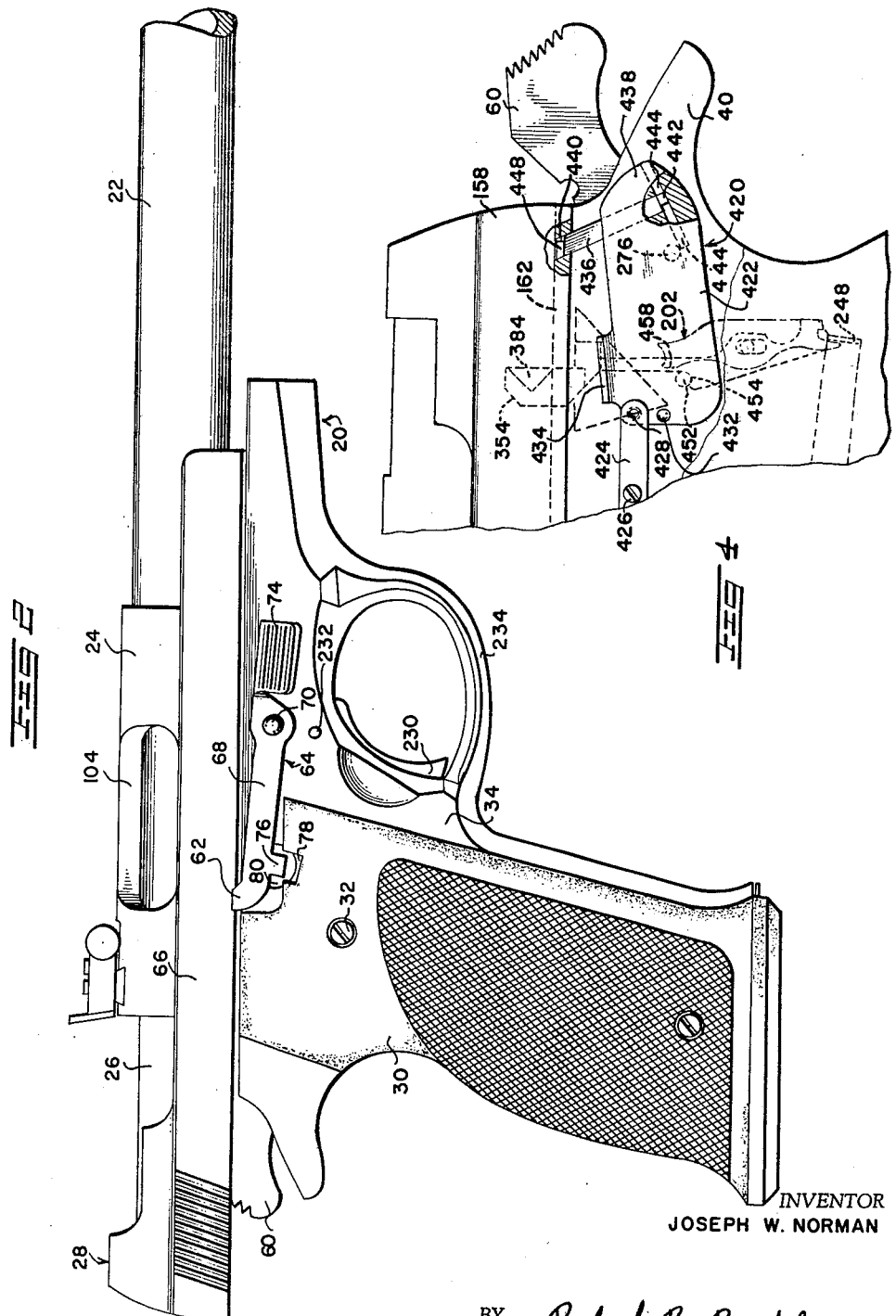

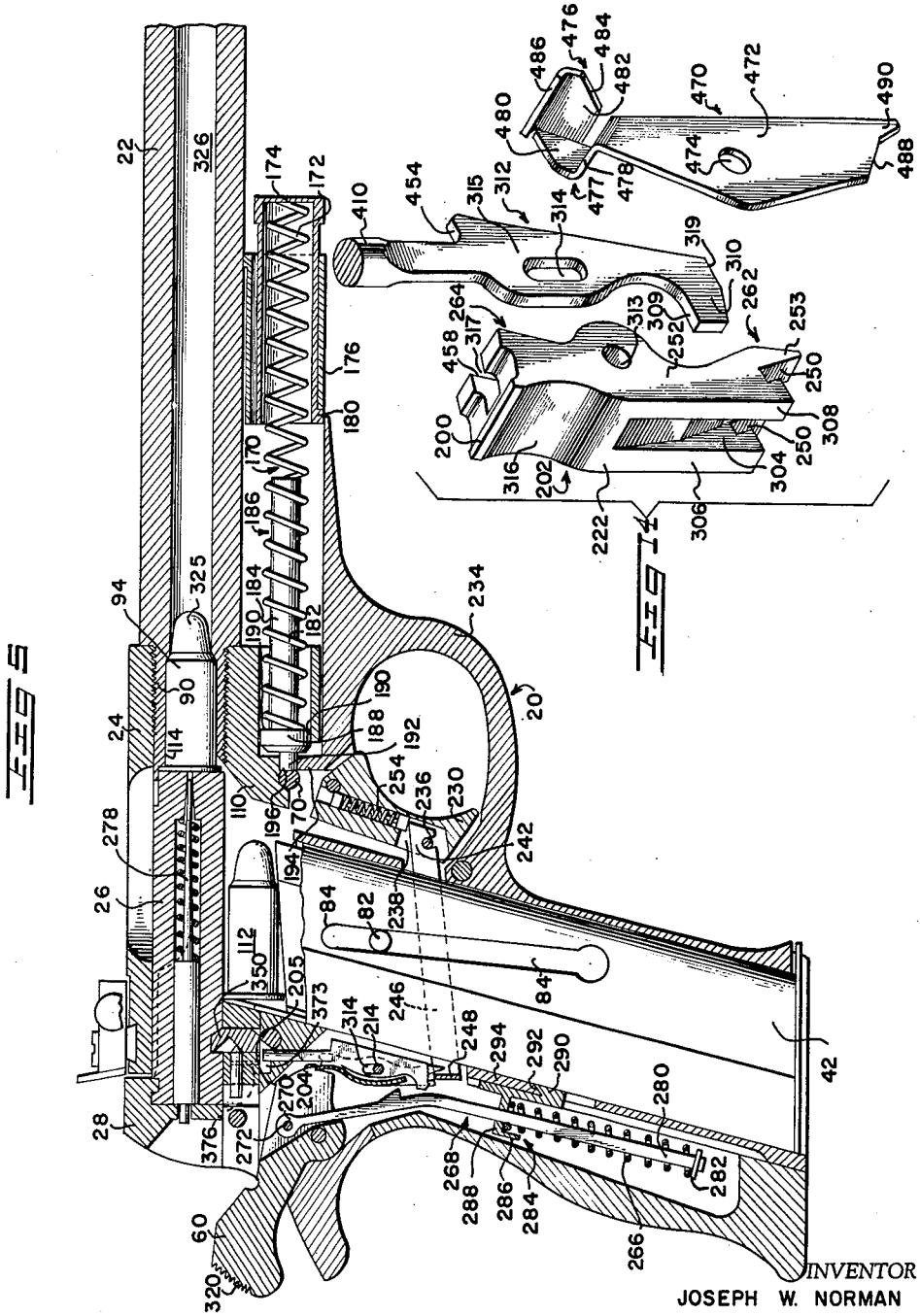

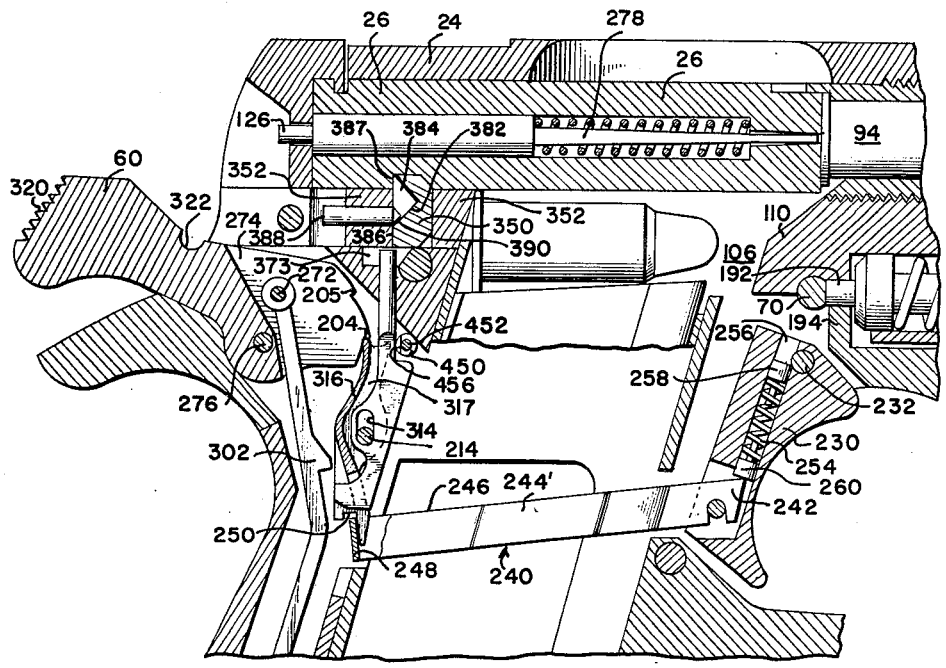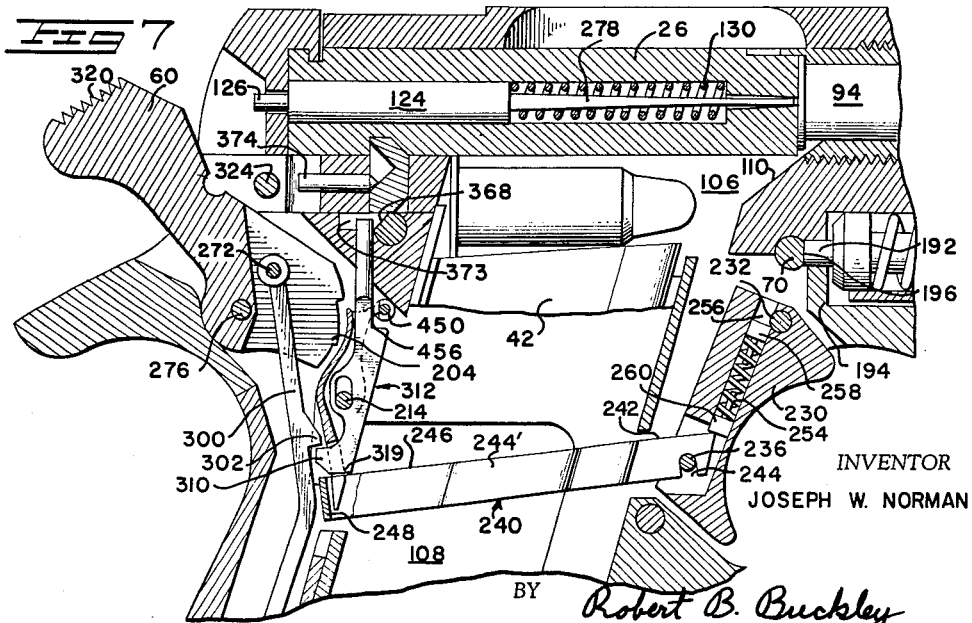

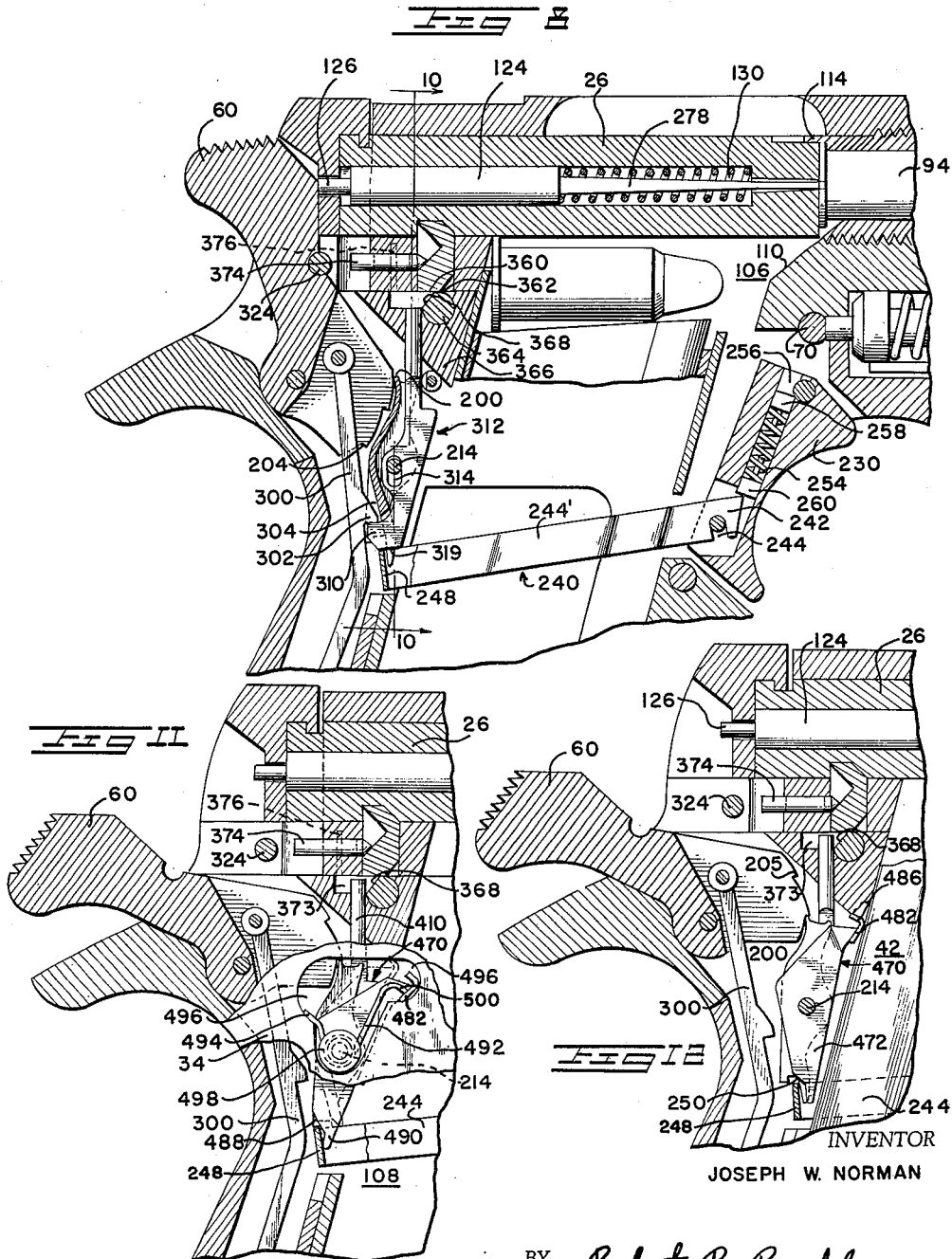

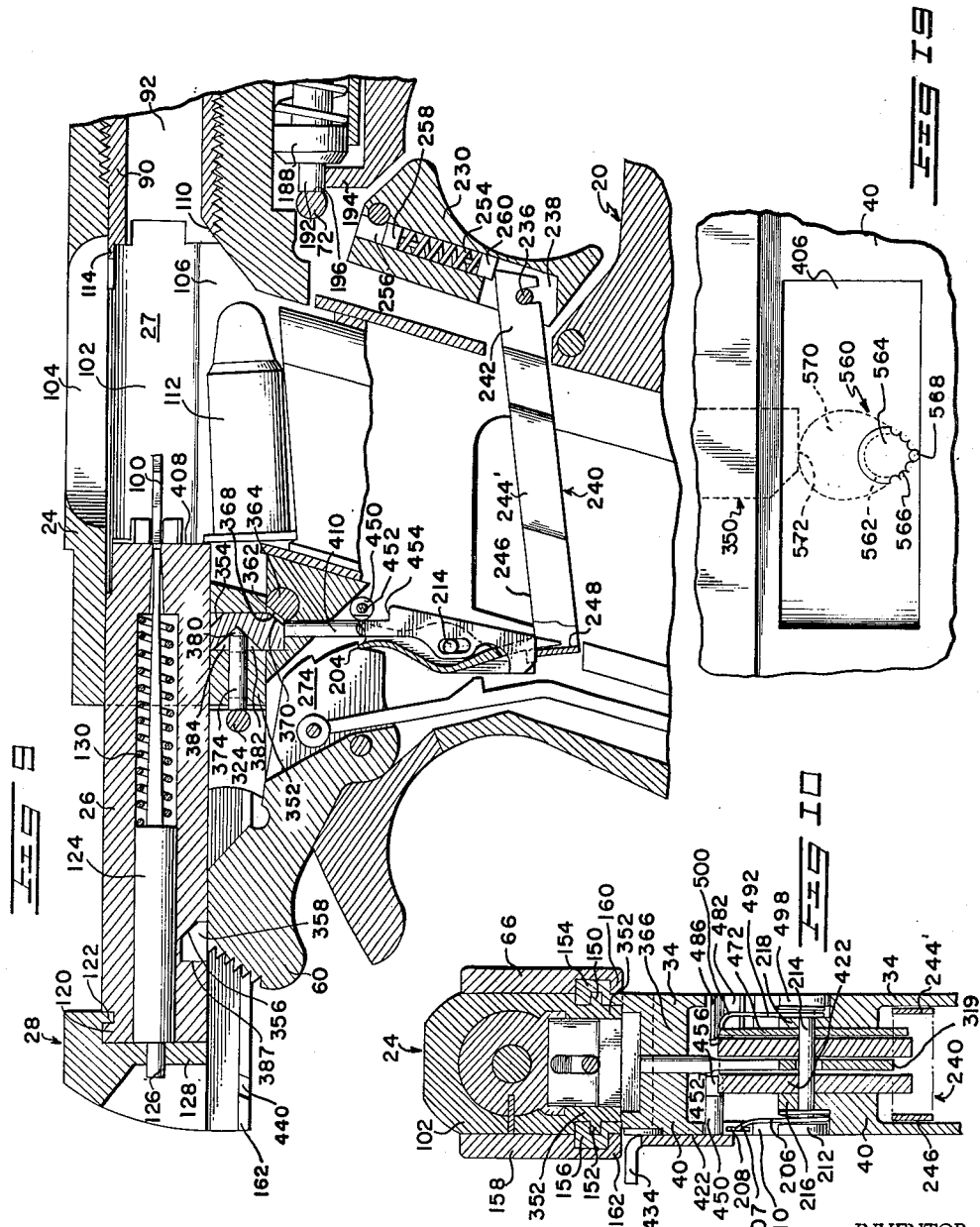

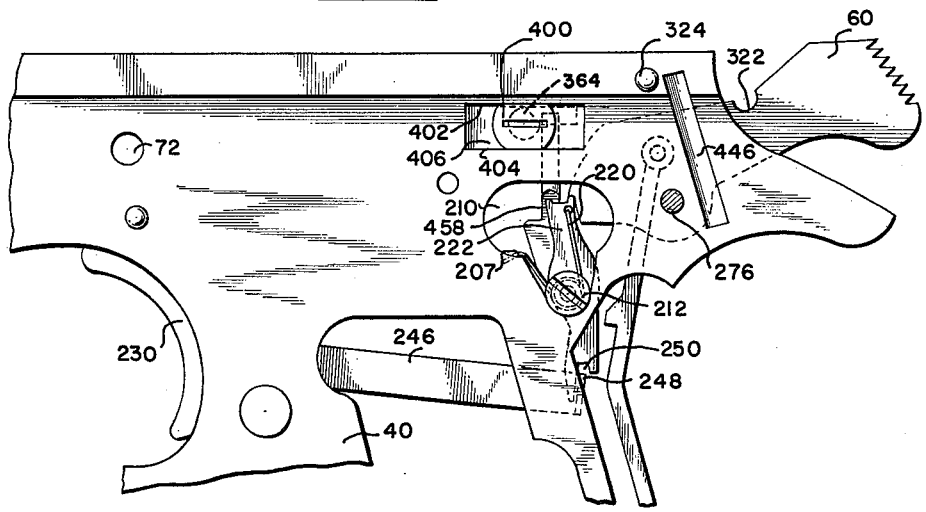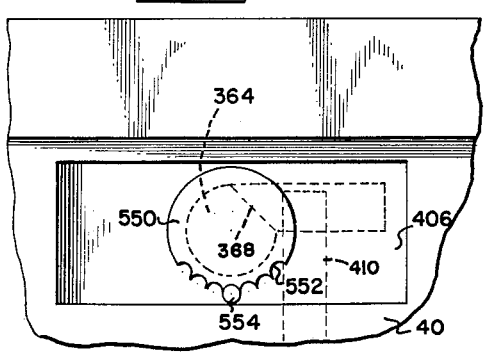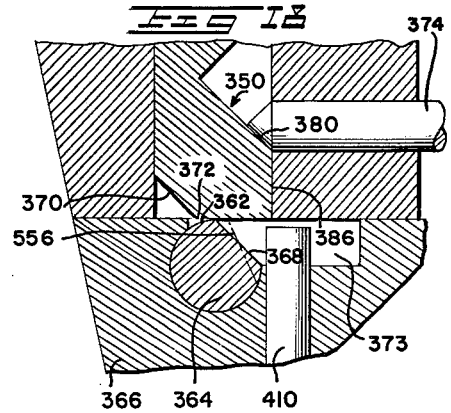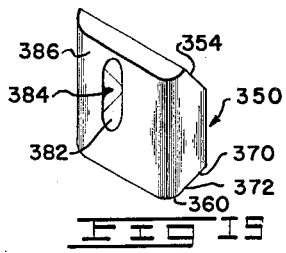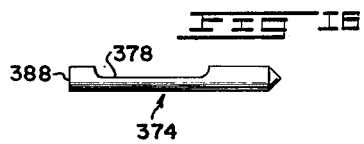

3,109,345
FIREARM WITH DISCONNECTOR OPERATED BY BREECH BOLT LOCK, AND OTHER IMPROVEMENTS
Joseph W. Norman, Springfield, Mass., assignor to Smith and Wesson, Inc., Springfield, Mass., a corporation of Massachusetts
Filed Aug. 22, 1960, Ser. No. 50,970
9 Claims. (Cl. 89—144)

This invention relates to firearms, and more particularly to pistols that are efficient, safe and accurate for use by marksmen, sportsmen, and law enforcement officers. The invention provides an autoloading firearm that distributes the recoil energy and force among several parts so as to avoid excessive recoil force being applied to any one part. The invention insures maximum thrust on the slug, together with an unusual degree of accuracy. The invention also contributes to safety by providing several safety devices for preventing unintended firing of the firearm.

Heretofore, various autoloading pistols have been provided wherein the bolt or breechblock recoils after firing, and on its rearward stroke extracts and ejects the empty cartridge case, and cocks the hammer for the next shot. A spring returns the bolt to battery position. On the return stroke the bolt pushes the next cartridge into the chamber. Prior pisols have locked the barrel to the bolt for a portion of the rearward recoil stroke. The explosion gases are thus retained in the volume of the chamber and barrel, until the bullet has left the muzzle and pressures have dropped to a safe level. After the bullet or slug has left the muzzle of the barrel, the bolt is unlocked from the barrel and completes the recoil stroke alone, moving rearwardly relative to the barrel.

Another purpose for temporarily locking the bolt to the barrel during the recoil is to slow the bolt. The acceleration of the barrel absorbs part of the explosion energy and thus the bolt is accelerated to a slower speed than it would achieve if the barrel did not recoil. Stress and strain on the parts is thus reduced. Also, the danger is lessened of injury which might occur if the bolt were to break the parts limiting its recoil stroke and strike the shooter.

In prior firearms, safety devices have been provided for disconnecting the firing mechanism under various conditions when unintended firing might occur or when firing might cause damage to the firearm or injury to the shooter. When the firing mechanism is thus disconnected, pulling the trigger does not fire the gun.

The invention provides a firearm wherein the bolt is locked to the barrel extension for a portion of the recoil stroke. This locking feature is combined with a safety feature in that the same mechanism which locks the bolt to the barrel extension also disconnects the firing mechanism so that the firearm can be fired only when the bolt is fully forward in battery position. Thus, the safety mechanism prevents the bursting of the cartridge case and flashback of exploding powder onto the shooter which might occur if a cartridge were fired when the bolt and cartridge are not at battery but are adjacent the ejection port.

The invention also provided for adjusting or changing the extent or duration of the unitary travel of the barrel extension and bolt. By this adjustment, the firearm can accommodate ammunition of different loadings and calibers to best advantage by changing the timing of the movements of the parts.

The timing is best when the bolt is unlocked from the barrel at a time when a small amount of residual pressure is available in order to help remove the cartridge case from the chamber, but not so much pressure that the brass cartridge case will tend to be ruptured when no longer supported by the hardened steel of bolt and barrel. If the gun is maintained in a locked-up condition for too great a time, so little energy will be available that the gun may not fully complete the unloading and reloading cycle; whereas if unlocking is accomplished too soon, the pressure within the cartridge case will be more than unsupported brass can stand and the case will fly apart as it leaves the confining chamber.

In firearms, the head space is the space left for the head of the cartridge case between the rear end of the barrel and the front end of the bolt when the bolt is at battery. A further object of the invenion is to provide for adjusing or changing the headspace, so that various makes and types of ammunition can be accommodated.

A further object of the invention is to provide a firearm wherein the firing mechanism is disconnected and rendered inoperative when the hammer is moved to forward position. Safety is thus provided in that the weapon cannot be fired until the hammer is cocked to permit connection of the firing mechanism.

A further object of the invention is to provide a disconnector shaped and configured for disconnecting the firing mechanism upon recoil of the bolt, operation of a manual safety, or forward movement of the hammer.

Another feature of the invention is a sear shaped and configured to be blocked by a manual safety, and to nest with and accommodate a disconnector whereby the firing mechanism is disconnected by recoil of the bolt, operation of a manual safety, or forward movement of the hammer.

When a person sees a semi-automatic pistol with the cartridge or clip removed, such person may assume that the pistol has no cartridge therein, although in fact there may be a cartridge in the chamber. To prevent injury produced by inadvertent firing, prior firearms have provided a safety device that disconnects the firing mechanism when there is no magazine in the pistol. The present invention provides a magazine-operated safety assembly of efficient and durable construction.

The parts of the firearm of the invention are constructed and configured so that four separate safety features are included, with economy of space and convenience of disassembly and assembly. That is, the magazine safety assembly, the disconnector and sear are commonly supported and shaped to nest together.

A further object of the invention is to provide elements of a firearm for accomplishing the aforementioned objects and advantages.

For a better understanding of the invention and its other objects, advantages and details, reference is now made to the present preferred embodiments of the invention which are shown, for purposes of illustration only, in the accompanying drawings.

In the drawings:

FIG. 1 is a side elevational view of an autoloading pistol according to the invention shown with the slide, bolt and hammer forward and viewed from the left-hand side;

FIG. 2 is a side elevation as viewed from the side opposite to that seen in FIG. 1, the right-hand side, and showing the slide retracted and locked in the retracted position and the hammer cocked;

FIG. 3 is an enlarged fragmentary side elevational view of the breech end of the pistol shown in FIG. 1 with parts broken away and showing the manual safety assembly in its off or disengaged position;

FIG. 4 is a view similar to FIG. 3 and showing the manual safety assembly in its engaged or on position;

FIG. 5 is a detailed vertical sectional view substantially through the center of the pistol;

FIG. 6 is an enlarged detailed fragmentary sectional view of the breech end of the pistol with the hammer cocked, the bolt locked at battery position, and the pistol ready for firing;

FIG. 7 is a view similar to FIG. 6 and showing the hammer moving in its firing stroke toward the firing pin after release by pulling the trigger;

FIG. 8 is a view similar to FIGS. 6 and 7 showing the pistol at the instant of explosion of the cartridge with the hammer engaging the firing pin and the firing mechanism disconnected by the hook on the hammer stirrup;

FIG. 9 is a view similar to FIGS. 6, 7 and 8, showing the pistol at recoil position with the bolt unlocked from the barrel extension, the bolt and slide retracted, the hammer cocked and the firing mechanism disconnected by the bolt lock;

FIG. 10 is a detailed vertical sectional view taken along the line 10—10 in FIG. 8;

FIG. 11 is an enlarged detailed fragmentary sectional view, partially in elevation, of the breech end of the pistol and showing the firing mechanism disconnected by absence of a magazine;

FIG. 12 is a view similar to FIG. 11 showing the magazine inserted in the pistol and the magazine holding the magazine safety assembly in connection-permitting position, and the firing mechanism connected;

FIG. 13 is a fragmentary side elevational view of the pistol frame as seen from the left side with the barrel, slide, bolt, stocks and manual safety plate removed;

FIG. 14 is an enlarged exploded perspective view of the sear, disconnector, and magazine safety lever;

FIG. 15 is a perspective view of the bolt lock for temporarily locking the bolt to the barrel extension;

FIG. 16 is a top plan view of the bolt lock plunger;

FIG. 17 is an enlarged fragmentary side elevational view of a modified form of the bolt lock cam pin that is adjustable by rotation to provide different durations of unitary recoil of the bolt and barrel extension;

FIG. 18 is a detailed sectional view of the structure shown in FIG. 17 with a phantom line indicating an alternative position of the bolt lock cam pin; and FIG. 19 is an enlarged fragmentary side elevational view of an eccentric form of bolt lock cam pin that is adjustable by rotation to provide different durations of locked recoil.

Briefly stated, the invention provides a pistol of the autoloading, self-loading, or semi-automatic type, including a frame, barrel, barrel extension fixed to the barrel, and a bolt slidable within the barrel extension. The barrel and barrel extension are locked to the bolt by a bolt lock for a portion of the recoil stroke so that a portion of the energy of recoil will be absorbed in moving the barrel and barrel extension and so as to maintain high pressure of propulsive gases on the slug until the slug leaves the muzzle of the barrel. After a portion of the recoil stroke, the bolt lock is moved to unlock the bolt from the barrel extension and the bolt completes the recoil rearward stroke without further rearward motion of the barrel and barrel extension. The slide moves integrally or unitarily with the bolt.

The duration of the unitary travel of the bolt and barrel-barrel extension is adjustable by using: (1) a set of bolt lock cam pins of various configurations (2) an adjustable bolt lock cam pin or (3) an eccentric bolt lock cam pin. Thus, the pistol can be adjusted or adapted to accommodate ammunition of various types having different explosive forces.

Four safety assemblies or features disconnect the firing mechanism. One is operated by the action of the bolt lock which prevents firing by disconnecting the firing mechanism when it unlocks the bolt from the barrel extension. Connection of the firing mechanism is permitted only when the bolt is forward to battery position. That is, when the bolt lock unlocks the bolt from the barrel extension, the bolt lock depresses a disconnector to disconnect the trigger bar from the sear so that a pull of the trigger will not actuate the sear and thus will not release the cocked hammer.

A second safety device is operated by the fall of the hammer. The stirrup connecting the main spring to the hammer is provided with a hook which depresses the disconnector upon forward movement of the hammer, so that the firing mechanism is disconnected when the hammer is forward.

Third, a manual safety plate is secured to the left side of the pistol and is movable downwardly, when the hammer is cocked, so that a pin attached to the plate engages and depresses the disconnector to disconnect the firing mechanism and also engages the sear to block pivoting of the sear. The manual safety plate also controls a slide catch which locks the slide in its forward or battery position.

The fourth safety device is actuated by an absence of magazine. Where a pistol has no cartridge or clip therein, someone handling the pistol might be under the impression that there is no cartridge in the chamber. Careless handling could result in unintended firing and undesired injury. To prevent such unintended firing, a magazine safety lever is provided and urged by a spring to a position where it depresses the trigger bar out of the notches in the sear to a position where the firing mechanism is disconnected. The insertion of the magazine pivots the magazine safety lever to position where connection of the firing mechanism is permitted.

The sear, disconnector and magazine safety plate are suspended on the same pivot pin and configured to nest together for economy of space.

General Structure

Referring to FIGS. 1 to 14 of the drawings, the autoloading pistol according to the invention includes a frame 20, a barrel 22 and a barrel extension 24 slidably positioned above the frame 20 and a bolt 26 slidable within a cavity 27 formed in the barrel extension 24. A slide 28 moves integrally with bolt 26. A pair of stocks are secured to opposite sides of the frame for gripping by the shooter. Referring to FIG. 2, a right-hand stock 30 is secured by stock screws 32 to the right-hand side 34 of frame 20. Referring to FIG. 1, a left-hand stock 36 is secured by stock screws 38 to the left-hand side 40 of frame 20.

In this application, the terms right-hand and left-hand are used relative to the position in which the pistol is normally held by a shooter for firing. The firing mechanism or lockwork is contained within the frame. A magazine or clip 42 holds and feeds a supply of cartridges.

Referring to FIG. 1, the pistol is shown with the hammer 60 forward and the slide 28, bolt 26, barrel 22 and barrel extension 24, in the forward or battery position. In FIG. 2, the pistol is shown with the slide 28 and bolt 26 retracted and held or locked in the retracted position by a lug 62 on slide stop assembly 64 engaged in a notch formed in the lower edge of the right-hand side 66 of the slide 28. The slide stop assembly 64 locks the slide in retracted position when the magazine is empty of cartridges. The slide stop assembly includes the bar 68 having a pin 70 extending therefrom through registering holes 72 in the frame sides. A thumb piece 74 extends on the opposite side of pin 70 from the bar 68 and is integral with the bar 68. The thumb piece 74 is inclined obliquely to the surface of the frame side 34 so as to be engageable by the thumb and finger for releasing the slide stop from the slide 28 and for disassembly of the pistol. The slide stop assembly 64 also includes a projection 76 extending into a mating notch 78 in stock 30 and through a hole 80 in frame side 34 and into the path of magazine follower pin 82, referring to FIG. 5, urged upwardly in magazine slot 84 by a conventional magazine follower spring (not shown).

When the last cartridge leaves the magazine 42, the magazine follower pin 82 engages the slide stop projection 76 to urge lug 62 into the notch in slide side 66.

Referring to FIGS. 5 and 9, the barrel 22 has a rear end 90 of reduced thickness and larger inner diameter to form a chamber 92 for cartridge 94. The barrel rear end 90 has external threads engaged by internal threads on barrel extension 24.

For aiming the pistol, a front sight 96 is secured to the barrel and a rear sight 98 is secured to barrel extension 24.

Referring to FIGS. 5, 9, and 10, the barrel extension 24 has an ejector 100 secured in a slot in its left-hand side 102. The ejector 100 is slidable in a mating slot in bolt 26. The barrel extension 24 has an ejection port 104 extending through its upper right corner for ejection of the fired cartridge cases from the pistol. The barrel extension 24 also has a feed opening 106 formed in its lower portion and registering with the magazine trackway 108 formed in the frame. The beveled surface 110 on barrel extension 24 and barrel 22 forms a ramp for directing the cartridge 112, referring to FIG. 9, upwardly into the chamber 92 as the bolt pushes cartridge 112 forward. An upper cartridge feed guide 114 extends rearwardly from the barrel end 90 for guiding the cartridge 112 into chamber 92.

With reference to FIGS. 5 and 9, the bolt 26 is releasably secured to the slide 28 by interengaging bolt flange 120 and slide flange 122 received in grooves formed in the bolt and slide. A firing pin 124 is slidably received in an axial opening in bolt 26 and has a rear extension 126 of diminished diameter extending through a hole formed in rear vertical plate 128 of slide 28. The firing pin return spring 130 urges the firing pin 124 rearwardly to maintain the bolt and slide locked together.

Referring to FIG. 10, the barrel extension 24 is slidably received between frame sides 34 and 40. The barrel extension has ribs 150 and 152 slidably received in slots formed on the inner surfaces of the flanges 154 and 156 formed at the upper ends of the frame sides 34 and 40, respectively, also seen in FIG. 13. The slide 28 slidably engages the outer surfaces of frame sides 34 and 40. The frame flanges 154 and 156 are received in grooves formed in the inner surfaces of slide sides 66 and 158. Slide flanges 160 and 162 slidably engage the lower edges of frame flanges 154 and 156, respectively.

When the slide 28 and bolt 26 are withdrawn, either manually or by force of the explosion of the powder charge in the cartridge, from the position shown in FIG. 1 to that shown in FIG. 2, the recoil spring 170, referring to FIG. 5, is compressed. The forward end 172 of the recoil spring 170 is received in a recoil spring retainer 174 of cylindrical tubular shape releasably held in the tubular forward end 176 of the slide 28. The recoil spring retainer 174 has an enlarged knurled head 178 at its forward closed end for grasping by the fingers of the shooter or operator for disassembly of the pistol. The recoil spring retainer 174 has a projection 180 at its rearward end engaging the tubular slide portion 176 whereby the recoil spring retainer 174 is retained releasably in the slide portion 176 under the compression of recoil spring 170.

The rearward end 182 of the recoil spring 170 surrounds the shank 184 of a recoil spring guide pin 186 having an enlarged head 188 forming a shoulder 190 abutted by the recoil spring 170. A stud 192 is integral with the recoil spring guide pin head 188 and extends from the end of the head and above the wall 194 of frame 20. The stud 192 abuts against a flattened surface 196 of slide stop pin 70.

The recoil spring 170 presses stud 192 against surface 196 of the slide stop pin 70, thereby tending to maintain the slide stop bar 68 depressed so as not to lock the slide in a retracted position shown in FIG. 2. However, a magazine follower spring (not shown) contained within the magazine 42, urges the magazine follower pin 82 upwardly with sufficient force to overcome the compression of recoil spring 170 and rotate the slide stop assembly to the position shown in FIG. 2, when the magazine 42 is empty.

By engaging the thumb piece 74 of slide stop assembly 64, the lug 62 can be lowered out of the notch in slide side 66 and then the force of recoil spring 170 moves the slide and bolt forward to battery position.

*Firing Mechanism*

Referring to FIG. 5, the pistol is illustrated with the bolt 26 and slide 28 at battery position and the hammer 60 cocked. A cartridge 94 is shown in the chamber 92 formed at the rear end of the barrel 22. The hammer 60 is held in cocked position by the nose 200 of sear 202 engaging the full-cock shoulder 204 on hammer 60. The sear nose can also engage half-cock shoulder 205 to hold the hammer at half-cock position.

A sear spring 206, referring to FIGS. 10, 13 and 14, presses or urges the sear 202 to the position where the sear nose 200 engages the hammer full-cock shoulder 204. The sear spring 206 has one end 207 engaged in a groove 208, referring to FIG. 10, formed in the frame side 40 around the periphery of an aperture 210 extending through the frame side 40 as seen in FIGS. 10 and 13. The sear spring 206 is coiled around sear pin nut 212 threadedly engaging sear pin 214 received in registering holes in flange 216 of frame side 40 and flange 218 of frame side 34. The sear pin 214 pivotally supports sear 202. The opposite end 220 of sear spring 206 has an inturned portion received in a hole formed in the sear side 222.

For firing the pistol, a trigger 230 is pivoted on a trigger pin 232 having its opposite ends journaled in registering apertures in the frame sides 34 and 40. A conventional trigger guard 234 is integral with the frame and extends around the trigger 230.

The firing mechanism includes a train of parts or elements engaging each other. The initial element is the trigger 230 having a trigger bar pin 236 formed integrally therewith and positioned in an opening 238 formed in the rear of the trigger 230. A trigger bar 240 includes a front arm 242 having a notch 244 formed in its lower edge. The notch receives the trigger bar pin 236. The trigger bar 240 has the general shape of a closed loop including the front arm 242, a right-hand side arm 244' and a left-hand side arm 246 and a rear plate 248 connecting the side arms. The rear trigger bar plate 248 is movable into notches 250 formed in the lower ends of sear side walls 222 and 252, referring to FIGS. 5 and 14. Tapered sear wall projections 253 guide the trigger bar plate 248 into notches 250.

The trigger bar 240 pivots about the fulcrum formed at trigger bar pin 236 and has its rear plate 248 urged upwardly by the action of trigger plunger spring 254 received in a hole 256 formed in the trigger 230. The trigger plunger spring 254 presses against the upper trigger plunger 258 abutting trigger pin 232 and against lower trigger plunger 260 slidably received in the hole 256 and pressing against the upper front corner of the trigger bar front arm 242.

With the pistol in the position shown in FIG. 5, the operator or shooter can fire or discharge the cartridge by pulling trigger 230 rearwardly with his finger. As trigger 230 pivots rearwardly around trigger pin 232, the trigger bar 240 is moved rearwardly and the rear trigger bar plate 248, engaged in notches 250 of sear 202, pivots the sear 202 around pivot pin 214 so as to move the lower portion 262 of sear 202 rearwardly and the upper portion 264 of sear 202 forwardly and bring sear nose 200 away from the full-cock hammer shoulder 204.

At this instant, the hammer 60 is released from the restraining action of sear 202 and the compressed main or firing spring 266 acts through stirrup 268 having a collar 270 at its upper end surrounding an eccentric pin 272 extending across a recess 274 formed in hammer 60. The stirrup 268 rotates the hammer 60 around hammer pin 276 from the position shown in FIGS. 5 and 6 through the intermediate position shown in FIG. 7 to the position shown in FIG. 8 where the hammer 60 engages firing pin extension 126 and drives the forward end 278 of firing pin 124 against the primer of cartridge 94 to explode the cartridge.

Referring to FIG. 5, the mainspring or firing spring 266 surrounds the lower end 280 of stirrup 268. The mainspring has its lower end abutting against a mainspring retainer 282 releasably secured to the lower stirrup end 280. The upper end of compression mainspring 266 abuts against mainspring seat 284 having a collar position 286 and an end wall with an aperture formed therein slidably receiving the stirrup 268. The mainspring seat 284 also includes a base plate 288 and an oblique projection 290 engageable with a beveled surface 292 in the rear wall 294 of the frame 20.

Hammer-Operated Safety

The operation of the hammer safety device of the invention is illustrated in FIGS. 7 and 8. When the hammer 60 is in the forward position shown in FIG. 8, the pistol appears harmless to some observers because it is not cocked. It is desirable that the firing mechanism be disconnected during such a period when it appears harmless and might be subject to careless handling. Further, in practice firing with no live ammunition, this disconnection gives the same sequence of hammer fall and disconnection to be found during actual functioning of the weapon.

For disconnecting the firing mechanism when the hammer 60 is forward, the upper end 300 of the stirrup 268 is provided with a hook, projection or lug 302, extending forwardly therefrom. As the hammer 60 moves in its firing stroke, as seen in FIGS. 7 and 8, the stirrup lug 302 enters the slot 304, referring to FIGS. 8 and 14, formed between the lower portions 306 and 308 of the sear sidewalls 222 and 252, respectively. The hook 302 engages plateau surface 309 of the foot 310 of disconnector 312.

The sear walls have aligned holes 313 formed therein for receiving pivot pin 214. The disconnector has a vertically-elongated slot 314 formed in its central portion 315. The slot 314 receives the pin 214 so that the disconnector 312 can vertically reciprocate thereon between disconnecting position and connection-permitting position. Referring to FIGS. 5 to 10, and 14, the sear side walls 222 and 252 are connected along their rear edges by a web 316. The disconnector central portion 315 is received in space 317 formed between sear walls 222 and 252.

The stirrup hook 302 presses the disconnector 312 downwardly until the disconnector bottom 319 engages the trigger bar plate 248 and depresses the trigger bar plate 248 out of the notches 250 in the sear 202. At the position illustrated in FIG. 8, the firing mechanism has been disconnected and a pulling of the trigger 230 will move the trigger bar rearwardly but will not move the sear 202 because the trigger bar plate 248 is disconnected or disengaged from the sear notches 250.

When the hammer 60 is pulled rearwardly, as by engagement of the thumb with the knurled portion 320 of the hammer 60, the stirrup 268 is raised because of the connection of stirrup 268 with eccentric pin 272 in hammer 60. This raising of the stirrup lifts the stirrup hook 302 and removes the downward pressure on the disconnector foot 310. Then the trigger plunger spring 254 pivots the trigger bar 240 around trigger bar pin 236 and pushes the trigger bar plate 248 upwardly to connected and engaged position in the notches 250 of the sear 202.

Bolt Lock

The forward motion of the hammer 60 is arrested by engagement of hammer groove 322 with hammer stop pin or bar 324 extending between the frame side flanges 154 and 156. After the discharge of the cartridge 94, occurring at the instant illustrated in FIG. 8, the slug 325 is propelled through the bore 326 of barrel 22 and the expanding propellant gases cause the recoil of the barrel 22, barrel extension 24, bolt 26 and slide 28.

So as to reduce the maximum velocity which the bolt 26 achieves, and contain pressures until the slug 325 leaves the barrel 22, the barrel 22 and barrel extension 24 are locked to the bolt 26 for a portion of the recoil stroke. Thereby, part of the energy of the expanding exploded propellant gases is absorbed in accelerating the barrel 22 and barrel extension 24. A bolt lock or locking member 350 locks the bolt 26 to the lower portion 352 of barrel extension 24. Referring to FIGS. 5, 9, and 15, bolt lock 350 has a beveled or oblique upper front surface 354, mating with a beveled or oblique upper front surface 356 in a notch 358 formed in the bottom of bolt 26.

At the instant of firing illustrated in FIG. 8, the bottom surface 360 of bolt lock 350 rests on the top arcuate surface 362 of bolt lock cam pin 364 received in a groove in frame portion 366, referring also to FIG. 10. The bolt lock cam pin 364 has a flat or planar surface 368, referring to FIGS. 9, 17 and 18, extending downwardly and rearwardly. The bolt lock 350 has a beveled or oblique lower front surface 370 for camming engagement with bolt lock cam pin flat surface 368. As the bolt 26 and barrel extension 24 recoil unitarily or together from the position illustrated in FIG. 8 to the position illustrated in FIG. 9, the bolt 26 travels unitarily with the barrel extension 24 until the corner 372 at the lower front edge of bolt lock 350 rides off the arcuate portion 362 of bolt lock cam pin 364 and is free to move downwardly through the slot in the lower barrel extension portion 352 with the bolt lock surface 370 sliding along the flat surface 368 of bolt lock cam pin 364. The bolt lock 350 then moves downwardly into recess 373 formed in frame portion 366.

When the bolt lock 350 is thus free to move downwardly, the beveled surface 356 of the bolt 26 exerts a force having a downward component upon the bolt lock 350 by engagement with the bolt lock surface 354. As soon as this camming downward motion commences, the bolt 26 is moving rearwardly out of the barrel extension 24.

The downward motion of bolt lock 350 into frame recess 373 is assisted by a bolt lock plunger 374 slidably received in an aperture in lower portion 352 of barrel extension 24. Referring to FIGS. 5, and 8, 11, and 16, the length of the stroke of plunger 374 is limited by a vertical bolt lock plunger pin 376 secured in barrel extension portion 352 and slidably received in groove 378 formed in the side of plunger 374. The front end of bolt lock plunger 374 is pointed or double-beveled so that the lower beveled surface 390, as seen in FIGURE 6, engages an oblique or beveled surface 382 of a notch 384 formed in the rear vertical surface 386 of bolt lock 350. The upper portion of surface 386 engages rear surface 387 of bolt notch 358. Upon recoil, the bolt lock plunger 374 moves rearwardly until its rear end 388 engages the hammer stop pin or bar 324. The bolt lock plunger 374 then remains stationary while the barrel extension moves rearwardly so that the bolt lock plunger 374, by the action of its surface 380 on bolt lock surface 382, cams the bolt lock 350 downwardly out of the bolt 26. In FIG. 9, the bolt lock plunger 374 is shown at its deepest penetration into bolt lock notch 384 and the bolt lock 350 is at its maximum downward position.

After the release of the bolt 26 from the barrel extension 24, the bolt 26 and slide 28 continue to recoil to the maximum recoil position illustrated in FIG. 9. The empty cartridge case moves rearwardly with the bolt until the cartridge case strikes ejector 100 which cams the case sidewise out through ejection port 104.

The bolt lock cam pin 364, referring to FIGS. 10 and 13, has an enlarged head 400 with flat upper and lower surfaces resting against the upper and lower edges 402 and 404 of a groove 406 formed in the left-hand frame side 40. In this manner, rotation of the bolt lock cam pin 364 is prevented. Such rotation might result from the stresses to which this part is subjected. Thereby, the extent or duration of unitary travel of the bolt 26 and barrel extension 24 is maintained constant.

However, where cartridges of different sizes, makes or propellant charges are to be employed, it can be desirable that the extent of unitary travel of bolt 26 and barrel extension 24 be varied or adjusted. In order to provide for such an adjustment, a set of bolt lock cam pins of different configurations can be provided having their flat surfaces 368 located in different relationships to the top of the pin. By removal of one pin and substitution of another, an adjustment in the extent of unitary travel can be made.

An adjustment of headspace can also be achieved by using bolt lock cam pins of different shape to change the upward limit of movement of bolt lock 350 into bolt notch 358 and thus changing the forward limit of movement of bolt 26.

Bolt Recoil Safety

The bolt lock 350 not only temporarily locks the bolt 26 to the barrel extension 24, but also provides a safety feature by disconnecting the firing mechanism when the bolt recoils. Upon its downward movement, the bolt lock bottom 360 strikes the upper end of cylindrical tubular tower 410 of disconnector 312 and depresses the disconnector 312 downwardly so that the bottom 319 of disconnector 312 depresses the trigger bar plate 248 out of engagement with the notches 250 of sear 202.

The disconnection of the firing mechanism produced by bolt lock 350 provides that there cannot be a firing or discharge of the pistol except when the bolt 26 is forward at battery. When the bolt is at battery, the bolt lock 350 is raised to permit the trigger bar plate 248 to be raised by the action of trigger plunger spring 254.

After the instant illustrated in FIG. 9, another cartridge 112 is fed from the magazine 42 and inserted in the chamber 92, and the pistol is returned to the battery position illustrated in FIG. 5. The recoil spring 170 exerts a forward force upon the slide 28 and the bolt 26. The bolt 26 in turn exerts a forward force upon the barrel 22 and barrel extension 24 by engagement with the bolt lock 350 and with the rear end of the barrel 22.

As the bolt 26 and slide 28 move forward from the recoil position illustrated in FIG. 9, the front surface 408 of bolt 26 pushes the next cartridge 112 into chamber 92. The cartridge feed guide 114 and ramp 110 guide the cartridge.

When the notch 358 in bolt 26 reaches the bolt lock 350, the bolt lock is urged upwardly by the trigger plunger spring 254 exerting upward pressure through trigger bar 240 upon the disconnector 312 which in turn acts upon the bolt lock 350. Thereafter, the bolt lock 350 is moved upwardly into the notch 358 and then carried forward with the bolt 26 so that bolt lock 350 is cammed upwardly by the engagement of its lower beveled surface 370 with the oblique flat surface 368 of bolt lock cam pin 364. The upward movement of the bolt lock 350 is continued until its bottom surface 360 is flush with the lower surface of the lower portion 352 of barrel extension 24. Eventually, the pistol reaches the cocked battery position illustrated in FIGS. 5 and 6, ready for firing.

Manual Safety

A manually-operated safety device is also provided in the pistol according to the invention. The manual safety assembly 420, referring to FIGS. 1, 3, 4, and 13, includes a manual safety plate 422 lying adjacent the left-hand frame side 40 and having hammer pivot pin 276 integral therewith and extending through mating holes in the frame sides 34 and 40 and a hole in hammer 60 to provide an axle for rotation for hammer 60. The manual safety plate 422 pivots around the hammer pin 276 between an upper disengaged or off position shown in FIG. 3 and a lower engaged, locking, or on position shown in FIG. 4.

To provide for a snap action of the manual safety plate 422 between these two positions, a manual safety spring plate 424 is secured to the frame side 40 by a screw 426 and has its rear end formed with an inwardly-projecting knob 428 engageable with either of two depressions 430 and 432 formed in the outer surface of the manual safety plate 422. The manual safety plate 422 has a horizontally-extending wing 434 for engagement by the thumb of the shooter to move the manual safety assembly between its two positions.

The manual safety assembly 420 performs three safety functions. Firstly, the slide 28 is locked in forward or battery position when the manual safety is rotated to the down position illustrated in FIG. 4. The manual safety slide catch 436 is pushed upwardly by the rear end 438 of plate 422 pivoting around pin 276. The slide catch enters a notch 440 in the slide flange 162 and a groove in slide side 158 to lock the slide 28 in the forward position shown in FIG. 4. The manual safety slide catch 436 has a lug 442 extending from its lower end. The lug 442 is slidably received in a groove 444 formed in the inner surface of the manual safety plate 422. Referring to FIG. 13, the manual safety slide catch 436 reciprocates in a slot 446 formed in frame side 40. A flange 448 is formed at the upper end of slide catch 436 for engaging notch 440.

Secondly, the trigger bar 240 is disconnected from the sear 202. A manual safety pin 450 is formed integrally with manual safety plate 422 and extends through aperture 210 in frame side 40 into the interior of the frame 20. The manual safety pin 450 has an end 452 of diminished diameter, referring to FIGS. 9 and 10, for engaging a ledge 454 of disconnector 312, referring to FIG. 14. When the wing 434 of manual safety plate 422 is depressed, the pin end 452 encounters ledge 454 and depresses disconnector 312 which pushes the trigger bar plate 248 out of sear notches 250 and disconnects the firing mechanism.

Thirdly, the manual safety pin 450 also has a flat surface 456, seen in FIG. 10, for abutting the front surface 458 of sear side wall 222. When the manual safety plate 422 is moved to the position shown in FIG. 4, the flat surface 456 of pin 450 abuts the front surface 458 of sear side wall 422 and prevents forward movement of this portion of the sear 202, thereby locking the sear in the position with the sear nose 200 engaged with a shoulder on the hammer 20. Thus, the manual safety pin 450 disconnects the firing mechanism, blocks the movement of the sear, and locks the slide.

Magazine Safety

A further safety device is provided to disconnect the firing mechanism upon absence of magazine. Persons observing the pistol without a magazine 42 therein might assume that there was no cartridge in the pistol. The observer could be mistaken if there is a shell or cartridge in the chamber 92 although the magazine is out of the pistol. This could result in accidental firing and unintended injury.

To prevent any such inadvertent injury, the pistol is provided with, referring to FIGS. 10, 11, 12, and 14, a magazine safety lever 470 including a body 472 having a hole 474 formed therein for receiving the sear pin 214 about which the lever 470 pivots.

An L-shaped section 477 connects the body 470 to a wing portion 476 for engaging the magazine 42. The L-shaped section includes a lateral plate 478 and a forward arcuate arm 480. The wing 476 includes a plate 482 with an oblique edge 484 and is rounded along its top to form a flange 486.

The body 472 has an oblique lower rear edge 488 for engaging and moving the trigger bar plate 248 downwardly and rearwardly and a shoe 490 for assisting in this disconnection of the firing mechanism.

Referring to FIGS. 10 and 11, a magazine safety spring 492 has one end 494 anchored in a groove in the frame side 34 in the surface around the periphery of hole 496 formed in the frame side 34. The spring 492 is coiled around sear pin 214 adjacent the enlarged head 498 of the sear pin 214. The spring has its opposite end 500 curved to press against wing plate 482 to urge the wing 476 into the magazine trackway 108. The L-shaped section 477 is connected to one end of plate 482 so that the spring end 500 firmly engages the inner end of plate 482 to prevent the spring from slipping off the plate. Thus the magazine safety spring 492 urges the magazine safety lever to the position shown in FIG. 11 where the magazine is absent, the wing 476 extends into the magazine trackway 108 and abuts the periphery of hole 496, and the oblique edge 488 and shoe 490 hold the trigger bar 240 disconnected from the sear 202.

The transversely-extending wing 476 provides a broad surface both for engagement with magazine 42 and with the periphery of hole 496. The wing 476 is positioned to swing clear of sear 202 and disconnector 312.

When the magazine 42 is inserted in the pistol, as shown in FIG. 12, the magazine 42 engages wing 476 and pivots the magazine safety lever 470 counterclockwise so that the oblique edge 488 and shoe 490 are disengaged from trigger bar plate 248. The trigger plunger spring 254 then pivots the trigger bar plate 248 into sear notches 250, and the firing mechanism is again connected.

Referring to FIGS. 10 and 14, the sear 202, disconnector 312, and magazine safety lever 470 are constructed and shaped to nest together with economy of space and efficiency of operation. The central portion 315 of disconnector 312 is received in the space 317 between sear side walls 222 and 252. The disconnector foot 310 extends between lower portions 306 and 308 of the sear side walls 222 and 252 and beneath the lower edge of web 316 and into slot 304 formed between the rear of lower portions 306 and 308. The slot 304 also receives the hook 302 on stirrup 268 when the hammer falls or moves forward and the hook 302 disconnects the firing mechanism. The sear side wall 222 has a front upper surface 458 for engagement by manual safety pin 450 to block rotation of the sear and thus prevent firing of the pistol when the manual safety is in the on or engaged position.

The ledge 454 on disconnector 312 is oriented to the sear surface 453 so that the manual safety pin end 452 depresses the disconnector by engagement with ledge 454 when the pin surface 456 is engaging sear surface 458 and blocking pivoting of the sear. The magazine safety lever 470 is shaped to pivot freely on pin 214 while avoiding any obstruction of the movements of disconnector 312 and sear 202.

*Operation of Pistol*

While much of the operation of the pistol has been disclosed in the foregoing decription, the operation will now be summarized. With the pistol as shown in FIG. 1, and a fresh magazine 42 inserted, the slide 28 is manually withdrawn to cock the hammer 60. The rearward limit of the parts is shown in FIG. 9 where the front surface 408 of bolt 26 has engaged the rim of cartridge 112. When the shooter releases the slide 28, the compressed recoil spring 170 moves the slide 28 and bolt 26 to the position shown in FIG. 5. During the return stroke, the cartridge is guided into the chamber 92 by ramp 110 and cartridge feed guide 114.

At the position shown in FIG. 5, the bolt 26 is at battery and the hammer is held at full cock by sear nose 200 engaging hammer shoulder 204. The mainspring or firing spring 266 is compressed. To fire the pistol, the shooter pulls trigger 230 rearwardly. The trigger bar pin 236 moves the trigger bar 240 rearwardly and trigger bar plate 248, engaged in sear notches 250, pivots sear 202 around pivot pin 214 so that the sear nose 200 is moved forwardly away from hammer shoulder 204.

With this release of the hammer 60, the compressed mainspring 266 moves the mainspring retainer 282 and stirrup 268 downwardly. The stirrup 268 by its connection with eccentric pin 272 swings the hammer 60 forwardly in its firing stroke. An intermediate position of the firing stroke of hammer 60 is illustrated in FIG. 7 where the hammer is approaching the firing pin extension 126. When the hammer 60 strikes the firing pin extension 126, the firing pin 124 is driven forward to compress the firing pin spring 130 and drive the firing pin end 278 into engagement with the primer of cartridge 94 to explode the cartridge and drive the slug thereof through the bore of barrel 22. This instant of explosion is illustrated in FIG. 8.

The forward motion of the hammer also disconnects the firing mechanism by engagement of stirrup hook 302 with plateau surface 309 of disconnector foot 310 to depress the disconnector 312 to move the trigger bar plate 248 out of the sear notches 250.

After the explosion illustrated in FIG. 8, the pistol recoils. Initially, the barrel 22, barrel extension 24, bolt 26 locked to the barrel extension 352 by bolt lock 350, and slide 28 all recoil together. When the lower forward edge 372 of bolt lock 350 rides off the arcuate portion 362 of bolt lock cam pin 364, the bolt lock 350 commences to move downwardly through the hole in the barrel extension portion 352, out of the notch 358 in bolt 26 and into frame recess 373. The bolt lock 350 is moved downwardly by the camming action of bolt surface 356 upon bolt lock surface 354 and also by the action of bolt lock plunger 374 acting on oblique surface 382 of bolt lock 350. The action of bolt lock plunger 374 is produced by its engagement with hammer stop pin 324.

As the bolt lock 350 moves downwardly into recess 373 in frame portion 366, the bolt lock 350 disconnects the firing mechanism by the engagement of its bottom 360 with tubular disconnector portion 410. The downward movement of bolt lock 350 pushes the disconnector 312 downwardly to disconnect the trigger bar 240 from the sear 202. Thus it will be seen that the firing mechanism is inoperative when the bolt 26 is recoiled.

When the bolt 26 reaches the rearmost position of recoil shown in FIG. 9, the forward surface 408 of the bolt engages another cartridge 112, pushed upwardly from the magazine 42 by the magazine spring (not shown). When the recoil spring 170 pushes the slide 28 and bolt 26 back to battery, the next cartridge 112 is delivered to the chamber 92.

As the bolt moves forward to battery, the notch 358 comes into alignment with bolt lock 350. At this point, the force of trigger plunger spring 254, acting through the trigger bar 240 and the disconnector 312, pushes the bolt lock 350 initially upwardly into the bolt notch 358. The rear surface 387 of the bolt notch 358 encounters the rear surface 386 of bolt lock 350 and moves the bolt lock forward so that the bolt lock surface 370 encounters bolt lock cam pin flat surface 368 and is cammed upwardly to the position shown in FIGS. 5 and 6. The pistol is then ready to be fired again.

The manual safety assembly 420 can be operated to the on position shown in FIGURE 4 only when the hammer 60 is cocked and the slide 28 and bolt 26 are at battery so that the notch 440 is lined up or in registry with slot 446 (seen in FIGURE 13) and slide catch 436. When the hammer is forward as seen in FIGURE 8, the manual safety is unnecessary and cannot be operated because the manual safety pin 450 cannot be depressed due to the upper end of the sear 202 blocking its downward movement. The upper end of the sear is held forward by the hammer. When the hammer is cocked as shown in FIGS. 3 and 4, the manual safety assembly 420 can be operated to the on position by the shooter pressing the wing 434 downwardly to pivot the manual safety plate 422 around hammer pin 276 to the on position where the projection 428 on manual safety spring plate 424 engages depression 430 in plate 422. This pivoting of plate 422 moves the manual safety slide catch 436 upwardly in groove 446 by the upward pivoting of rear end 438 of plate 422 and the engagement of manual safety slide catch lug 442 in the groove 444 of plate 422. As the manual safety slide catch 436 is moved upwardly, its flange 448 enters notch 440 in the slide flange 162 to lock the slide 28 in the forward position shown in FIG. 4.

The aforedescribed pivoting of manual safety plate 422 by the shooter's thumb pressing downwardly on wing 434 also moves the pin 450 downwardly so that the pin end 452 engages disconnector shelf 454, depressing the disconnector 312 to disconnect trigger bar 240 from sear 202. Also, the flat surface 456 of pin 450 abuts the front surface 458 of sear side wall 222 to block forward movement of the sear and maintain the sear nose 200 engaged with the cock shoulder of hammer 60.

The firing mechanism can also be disconnected by removal of magazine 42 which permits spring 492 to rotate magazine safety lever 470 from the position shown in FIG. 12 to the position shown in FIG. 11 where the lever surface 488 and shoe 490 press the trigger bar 240 out of sear notches 250.

When a magazine 42 is inserted in the pistol, the magazine safety lever 470 is pivoted from the disconnecting position, shown in FIG. 11, to the connection-permitting position shown in FIG. 12.

Adjustable Bolt Lock Cam Pins

In FIGS. 17 and 18, there is disclosed a modification of the bolt lock cam pin 364 wherein parts similar to the embodiment shown in FIGS. 1 to 16 have the same reference numerals. This embodiment differs in that the bolt lock cam pin 364 has a substantially-circular enlarged head 550 having a plurality of grooves 552 formed in its periphery. A locator pin 554 is releasably secured in groove 406 formed in frame side 40 and engages one of the grooves 552.

The bolt lock cam pin 364 is received in a groove formed in frame portion 366 and has its flat surface 368 oriented to determine and limit the extent of recoil of the barrel 22 and barrel extension 24. In order to change the orientation of bolt lock cam pin surface 368, the locator pin 554 is removed, the bolt lock cam pin 364 is rotated, as by a tool, to move the location of the cam surface 368 to one such as shown by the phantom line 556 in FIG. 18. Then the locator pin 554 is reinserted and, by its engagement with the groove 552, in which it is now received, maintains the orientation of the bolt lock cam pin constant for this particular setting.

A more vertical positioning of the flat surface 368 will hold bolt and barrel extension locked together for a longer time, thus allowing greater attenuation of breech pressures in the case of high powered cartridges. For very light loads such as those used in target practice, flat surface 368 may be located more horizontally, thus moving the high point of pin 364 further forward and allowing bolt and barrel extension to commence separation at an earlier stage in the recoil cycle when pressures of the lightly loaded cartridge will still be sufficient to operate the action.

Referring to FIG. 19, an eccentric bolt lock cam pin 560 is disclosed having stud portions 562 rotatably received in holes in frame sides 40 and 34, respectively. Stud portion 562 has an enlarged head 564 having a plurality of grooves 566 formed in its periphery. A locator pin 568 is releasably secured in groove 406 formed in frame side 40 and engages one of the grooves 566.

The bolt lock cam pin 560 has an eccentric portion 570 integral therewith and engaging the lower surface of bolt lock 350. By removing the locator pin 568 and rotating the head 564, the eccentric portion 570 is rotated so as to raise or lower the high point 572 of the eccentric portion on which the bolt lock 350 will ride. Lowering this high point will allow the bolt lock 350 to assume a lower position in bolt 26, thus camming the bolt forward to a lesser extent and increasing the head space. Raising the high point will decrease the head space.

This rotation of eccentric bolt lock cam pin 560 can also change the unlocking point at which the bolt 26 is unlocked from the barrel extension 24 during recoil.

Thus it will be seen that the invention provides an autoloading pistol wherein the barrel and barrel extension recoil with the bolt and slide for a portion of the recoil stroke and various safety mechanisms are provided to prevent undesired and inadvertent discharges of the pistol.

While the present preferred embodiments of the invention have been illustrated and described, it will be recognized that the invention can be otherwise variously embodied and practiced within the scope of the following claims.

I claim:

1. An autoloading firearm comprising a frame; a barrel; a barrel extension extending rearwardly of said barrel; a bolt within said barrel extension, said bolt having a notch formed on its lower surface; said barrel extension having a lower portion located beneath said bolt with an aperture formed therein; a bolt lock slidably positioned in said barrel extension aperture, said bolt lock having its upper end shaped to enter said notch in said bolt and lock said bolt to said barrel extension; a locking cam fixed to said frame and extending beneath said bolt lock when said bolt and barrel extension are in forward battery position, said locking cam having an upper surface with a rear edge determining the position at which said bolt lock can move downwardly to release said bolt from said barrel extension; said bolt lock having a beveled notch formed in its rear side; said lower barrel extension portion having a hole formed therein substantially parallel with the path of travel of said bolt; an unlocking plunger slidably positioned in said hole and having a beveled front surface for engaging the beveled surface in said bolt lock notch, and, a stop bar fixed to said frame and extending across the rear end of said unlocking plunger.

2. A firearm comprising a frame; a barrel; a barrel extension extending rearwardly of said barrel and fixed to said barrel; a bolt within said barrel extension; a firing pin slidably received within said bolt; a hammer pivoted on said frame movable to cocked position and pivotable for engaging said firing pin; a firing spring mounted on said frame; a stirrup connecting said firing spring to said hammer; a sear for holding said hammer cocked; a trigger bar releasably engageable with said sear for moving said sear to release said hammer; said bolt having a notch formed in its lower surface; said barrel extension having an aperture formed in its portion beneath said bolt; a bolt lock positioned in said barrel extension aperture and movable to engage said bolt notch to lock said bolt to said barrel extension; means engaging said bolt lock for retaining said bolt lock in said locking position for a portion of said recoil stroke; means for moving said bolt lock out of said bolt notch after said portion of said recoil stroke; a disconnector separate from said bolt lock and movable to disconnect said trigger bar from said sear, said disconnector having a portion engaged by said bolt lock as said bolt lock moves to bolt-unlocking position to cause said disconnection of said trigger bar from said sear; whereby said firearm cannot be fired when said bolt is recoiled.

3. An autoloading firearm comprising a barrel extension; a bolt slidably positioned in said barrel extension; a bolt lock releasably locking said bolt to said barrel extension; a rotatable bolt lock cam pin engaging said bolt lock and determining the movement thereof, said bolt lock cam pin having an eccentric portion engaging said bolt lock.

4. A firearm comprising a barrel extension having a cavity formed therein; a bolt positioned in said barrel extension cavity; a bolt lock movable to a first position where it locks said bolt to said barrel extension and to a second position where it unlocks said bolt from said barrel extension; a firing mechanism that is disconnectable so that the firearm cannot be fired, said firing mechanism including a hammer pivotally mounted; a sear engageable with said hammer to hold it cocked; a trigger; a trigger bar operatively connecting said trigger to said sear, said trigger bar being movable to a disconnected position; a disconnector separate from said bolt lock and movable to disconnect said trigger bar from said sear; said disconnector having a portion positioned adjacent said bolt lock so that, when said bolt lock moves to said second position where it unlocks said bolt from said barrel extension, said bolt lock engages and moves said disconnector to disconnect said trigger bar from said sear.

5. A firearm comprising a frame; a barrel; a barrel extension secured to said barrel and slidably supported on said frame, said barrel extension having a cavity formed therein; a bolt slidable in said cavity between recoil and battery; a hammer pivotable between cocked position and firing position; a sear engageable with said hammer to hold said hammer in cocked position; a trigger bar engageable with said sear to move said sear out of engagement with said hammer; a bolt lock movable to a first position where it locks said bolt to said barrel extension and to a second position where it unlocks said bolt from said barrel extension; a disconnector separate from said bolt lock and movable to disconnect said trigger bar from said sear, said disconnector having a portion engageable by said bolt lock when said bolt lock moves to its unlocking position thereby disconnecting said trigger bar from said sear; a stirrup connected to said hammer and actuating said hammer, said stirrup having a projection formed thereon for engaging said disconnector when said hammer is moved to firing position thereby to disconnect said trigger bar from said sear.

6. In a firearm comprising a frame, a barrel, a barrel extension secured to said barrel and slidably supported on said frame, said barrel extension having a cavity formed therein; a bolt slidable in said cavity between a recoil position and a battery position, a hammer pivotal between cocked position and firing position, a sear engageable with said hammer to hold said hammer in cocked position, a trigger bar engageable with said sear to move said sear out of engagement with said hammer, said trigger bar being connected to said trigger for movement in response to pulling of said trigger, said trigger bar being movable between a position where it is engageable with said sear and a position disengaged from said sear, and a disconnector movable to disconnect said trigger bar from said sear; the improvement which comprises a bolt lock separate from said disconnector and movable to a first position where it locks said bolt to said barrel extension and to a second position where it unlocks said bolt from said barrel extension, said bolt lock being movable to engage said disconnector when the bolt lock moves to said unlocking position thereby to move said trigger bar to disconnected position from said sear, and, means for adjusting the point in the recoil stroke at which said bolt is unlocked from said barrel extension.

7. A firearm comprising a frame; a barrel; a barrel extension secured to said barrel and slidably supported on said frame, said barrel extension having a cavity formed therein; a bolt slidable in said cavity between recoil and battery; a hammer pivotal between cocked position and firing position; a sear engageable with said hammer to hold said hammer in cocked position; a trigger bar movable into operative engagement with said sear to move said sear out of engagement with said hammer; a bolt lock movable to a first position where it locks said bolt to said barrel extension and to a second position where it unlocks said bolt from said barrel extension; a disconnector separate from said bolt lock, said disconnector being movable to disconnect said trigger bar from said sear, said disconnector having a portion engageable by said bolt lock when the bolt lock moves to said unlocking position thereby to disconnect said trigger bar from said sear; means for adjusting the point in the recoil stroke at which said bolt is unlocked from said barrel extension; said hammer having a stirrup connected thereto, said stirrup having a lug projecting therefrom, said disconnector having a surface formed thereon to be engaged and depressed by said lug upon the firing stroke of said hammer to disconnect said trigger bar from said sear.

8. In an autoloading firearm including a barrel, a barrel extension fixed to the rear of said barrel, a bolt received in said barrel extension, said bolt being movable to a forward battery position where it is spaced from the rear end of said barrel by headspace, said bolt being movable subsequent to firing rearwardly in a recoil stroke; the improvement which comprises means for adjusting said headspace including a bolt lock slidably positioned in an aperture formed in said barrel extension, said bolt having a notch formed in its lower surface, said notch having a beveled forward upper surface, said bolt lock being movable to enter and mate with said notch in said bolt and lock said bolt to said barrel extension, said bolt lock having a beveled upper forward surface for camming engagement with said beveled forward upper surface of said notch and means for adjusting the limit of the movement of said bolt lock into said notch thereby adjusting the limit of the forward movement of said bolt by the camming action of said beveled surfaces.

9. In an autoloading firearm including a barrel extension, a bolt received in said barrel extension, a firing pin engageable with a cartridge, a hammer pivotally mounted to engage said firing pin, a sear engageable with said hammer to hold the hammer retracted, a mainspring urging said hammer to engage said firing pin, a trigger bar movable to a position where it operatively connects said trigger to said sear; the improved combination which comprises means locking said bolt to said barrel extension during a portion of the recoil of said bolt subsequent to firing, and a disconnector separate from said locking means, said disconnector being movable to move said trigger bar out of operative connection with said sear, said locking means engaging said disconnector upon recoil of said bolt to disconnect said trigger bar from said sear.

References Cited in the file of this patent

UNITED STATES PATENTS

| 684,331 | Wesson | Oct. 8, 1901 |
| 728,739 | Mannlicher | May 19, 1903 |
| 984,519 | Browning | Feb. 14, 1911 |
| 1,293,776 | Hillman | Feb. 11, 1919 |
| 1,410,268 | Pedersen | Mar. 21, 1922 |
| 2,125,933 | Lewis | Aug. 9, 1938 |
| 2,159,527 | King | May 23, 1939 |
| 2,388,149 | Humeston | Oct. 30, 1945 |
| 2,390,061 | Eklund | Dec. 4, 1945 |
| 2,422,854 | Reising | June 24, 1947 |
| 2,455,830 | Tompkins | Dec. 7, 1948 |
| 2,490,474 | Roemer | Dec. 6, 1949 |
| 2,527,895 | Tassan | Oct. 31, 1950 |
| 2,563,720 | Guisasola | Aug. 7, 1951 |
| 2,645,160 | Gilligan | July 14, 1953 |
| 2,795,171 | Gaidos | June 11, 1957 |
| 2,846,925 | Norman | Aug. 12, 1958 |
| 2,922,240 | Allyn | Jan. 26, 1960 |
| 2,959,107 | Sturtevant | Nov. 8, 1960 |

FOREIGN PATENTS

| 786,652 | France | June 17, 1935 |
| 731,170 | Germany | Feb. 3, 1943 |
| 107,735 | Sweden | June 22, 1943 |